US012596423B2

(12) United States Patent
　　Ma

(10) Patent No.: US 12,596,423 B2
(45) Date of Patent: Apr. 7, 2026

(54) CONTROL METHOD AND APPARATUS

(71) Applicant: Lenovo (Beijing) Limited, Beijing (CN)

(72) Inventor: Binqiang Ma, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 172 days.

(21) Appl. No.: 18/532,177

(22) Filed: Dec. 7, 2023

(65) Prior Publication Data

US 2024/0219992 A1　　Jul. 4, 2024

(30) Foreign Application Priority Data

Dec. 30, 2022　(CN) .......................... 202211731501.8

(51) Int. Cl.
　　*G06F 1/00*　　　(2006.01)
　　*G06F 1/3234*　　(2019.01)
(52) U.S. Cl.
　　CPC ................................. *G06F 1/3234* (2013.01)

(58) Field of Classification Search
　　CPC ............................ G06F 1/3234; G06F 9/4812
　　See application file for complete search history.

(56) References Cited

U.S. PATENT DOCUMENTS

| | | | |
|---|---|---|---|
| 9,361,851 B1 * | 6/2016 | Basehore | .............. G06F 1/1647 |
| 11,194,364 B1 * | 12/2021 | Mori | ..................... G06F 3/0416 |
| 2004/0212610 A1 * | 10/2004 | Hamlin | ................. G06F 3/1423 345/211 |
| 2014/0292662 A1 * | 10/2014 | Saito | .................... H04N 23/632 345/168 |
| 2022/0376377 A1 * | 11/2022 | Huang | ................... H01Q 1/245 |

* cited by examiner

*Primary Examiner* — Xuxing Chen
(74) *Attorney, Agent, or Firm* — ANOVA LAW GROUP, PLLC

(57) ABSTRACT

A control method for an electronic device includes responding to a received first signal and sending a first trigger instruction when a first processor is in a first mode and responding to the received first signal and sending the first trigger instruction and a second trigger instruction when the first processor is in a second mode. The first rigger instruction is used to trigger a first event in an operating system. The second trigger instruction is used to trigger a second event in the operating system.

12 Claims, 6 Drawing Sheets

CONTROL METHOD AND APPARATUS

CROSS-REFERENCE TO RELATED APPLICATION

The present disclosure claims priority to Chinese Patent Application No. 202211731501.8, filed on Dec. 30, 2022, the entire content of which is incorporated herein by reference.

TECHNICAL FIELD

The present disclosure relates to the communication technology field and, more particularly, to a control method and an apparatus.

BACKGROUND

Currently, for electronic devices such as laptops and cell phones, operating systems usually support Lid Close, flipping, or shortcut keys to quickly trigger the electronic devices to enter states such as hibernation, sleep, or screen off, without the user having to open a control menu to select a button of a corresponding state. Thus, the electronic devices can be operated more conveniently.

SUMMARY

One aspect of the present invention provides a control method. The method includes responding to a received first signal and sending a first trigger instruction when a first processor is in a first mode and responding to the received first signal and sending the first trigger instruction and a second trigger instruction when the first processor is in a second mode. The first rigger instruction is used to trigger a first event in an operating system. The second trigger instruction is used to trigger a second event in the operating system.

One aspect of the present invention provides a control method. The method includes performing a first configuration operation by a target application to cause the first processor to switch between a first mode and a second mode. In the first mode, the first processor responds to a received first signal and sends a first trigger instruction, and the first trigger instruction is used to trigger a first event in an operating system. In the second mode, the first processor responds to the received first signal and sends the first trigger instruction and a second trigger instruction, and the second trigger instruction is used to trigger a second event in the operating system.

One aspect of the present invention provides a control apparatus deployed in a first processor of an electronic device, including a first trigger module and a second trigger module. The first trigger module is configured to respond to a received first signal and send a first trigger instruction when the first processor is in a first mode. The second trigger module is configured to respond to the received first signal and send the first trigger instruction and a second trigger instruction when the first processor is in a second mode. The first trigger instruction is used to trigger a first event in an operating system. The second trigger instruction is used to trigger a second event in the operating system.

DETAILED DESCRIPTION OF THE EMBODIMENTS

Figure 1:
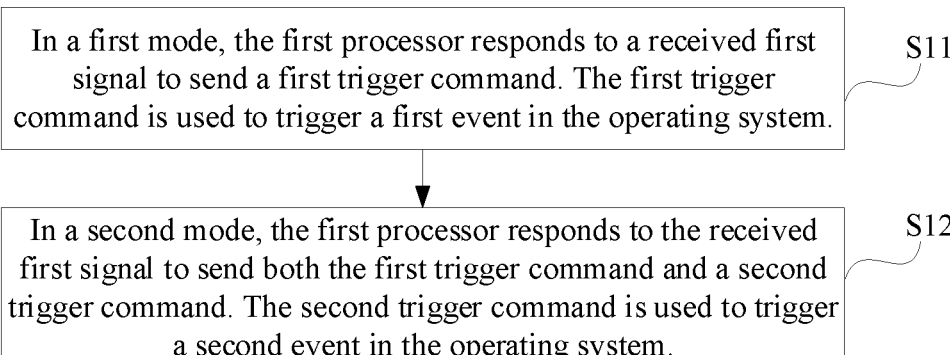
FIG. 1 illustrates a schematic flowchart of a control method according to some embodiments of the present disclosure.

In the description of the background, when a user uses an application of an electronic device, the user wants to quickly trigger a certain function of the application through an action such as Lid Close (e.g., two bodies of a laptop are closed), screen flipping, or a shortcut key. For example, for a laptop with a plurality of screens, when a screen on surface B outputs display content, the user can perform Lid Close to cause the display content to be sent to a screen on surface A to be continuously displayed. However, such user configuration information may conflict with configuration information for the Lid Close event to perform hibernation/sleep in the operating system. Thus, the user configuration information cannot be performed. That is, the application function such as screen switching may not be quickly triggered through the Lid Close operation.

To address the above issue, "Do Nothing" can be configured and performed for an event generated by an operation such as Lid Close, screen flipping, or shortcut key. That is, the operating system does not perform a trigger instruction. Thus, when the electronic device is used, the user performs such a shortcut operation, an operation such as screen switching can be performed according to the configuration information defined by the user to temporarily avoid configuration conflict. However, once the user changes the configuration of "Do Nothing," the above conflict can still not be avoided.

To further improve the issue above, for the shortcut operation above, the present disclosure provides a first processor (Embedded Controller (EC) chip,), which controls the triggering of an event in different methods, referred to as different modes. In some embodiments according to the actual needs of the electronic device, a proper method can be selected to control the triggering of the event.

In some embodiments, after receiving a Lid Close signal, the first processor can trigger a corresponding event such as screen switching according to the configuration content of the user for the Lid Close signal in a mode, which is referred to as a mode switch event. In another mode, the Lid Close operation can satisfy trigger conditions for the Lid Close event and the mode switch event simultaneously. However, the first processor does not respond to the mode switch event but directly responds to the Lid Close event to cause the electronic device to enter a state, such as hibernation/sleep/ screen off. Thus, the conflict between the configuration contents of the Lid Close event and the mode switch event can be avoided, which ensures the reliability and accuracy of controlling the electronic device to perform a required action through the Lid Close operation in different application scenes of the electronic device.

The technical solution of embodiments of the present disclosure is described in detail below in connection with the accompanying drawings of embodiments of the present disclosure. Described embodiments are merely some embodiments of the present disclosure not all embodiments. All other embodiments obtained by those of ordinary skill in the art without creative efforts based on embodiments of the present disclosure are within the scope of the present disclosure.

FIG. 1 illustrates a schematic flowchart of a control method according to some embodiments of the present disclosure. The method can be applied to electronic devices such as laptops, cell phones, tablets, etc. The method can be performed by the first processor (e.g., EC chip) of the electronic device. As shown in FIG. 1, the control method of embodiments of the present disclosure includes the following processes.

At S11, in a first mode, the first processor responds to a received first signal to send a first trigger instruction. The first trigger instruction is used to trigger a first event in the operating system.

At S12, in a second mode, the first processor responds to the received first signal to send both the first trigger instruction and a second trigger instruction. The second trigger instruction is used to trigger a second event in the operating system.

In combination with the previous description of the technical solution of the present disclosure, when performing an operation such as Lid Close, screen flipping, or shortcut key pressing on the electronic device, the first processor can obtain the first signal representing a corresponding operation. The first processor can determine which event control method is used to trigger which event in the operating system when responding to the signal according to the current mode of the electronic device.

In some embodiments, in the first mode, the first processor may not be allowed to directly trigger the event represented by the first signal content1, such as the Lid Close event corresponding to the Lid Close signal. The first processor can trigger a corresponding event according to the configuration information of the user for the first signal content, for example, the screen switch event configured for the Lid Close operation in the electronic device with a plurality of screens. If the user configures another type of event for the Lid Close operation, the another type of event can be triggered.

Correspondingly, in the second mode, the first processor can directly trigger the event represented by the first signal content, such as the Lid Close event corresponding to the Lid Close signal. The screen switch event can be also configured for the Lid Close signal, i.e., the user can configure another type of event for the first signal content. The Lid Close signal can satisfy the trigger condition of the another type of event. That is, the same signal content can satisfy two types of events of different control methods. To avoid conflict, only the event represented by the first signal content can be triggered, and the another event configured by the user cannot be triggered. Specific implementations are not limited in the present disclosure.

In some embodiments, the first processor can be switched between the first mode and the second mode according to the actual needs of the electronic device. In some embodiments, if the event configured by the user for the shortcut operation is responded to by the target application in the operating system, the first processor can be triggered to enter the first mode or the second mode according to the configuration of the target application. The configuration operation content of the target application can be determined flexibly according to actual needs, which is not limited in the present disclosure. In addition, the first processor can be triggered to enter the first mode or the second mode through a physical key, a functional button, or a specific trigger method in the present disclosure. The implementation for triggering the mode switching between the two modes is not limited in the present disclosure.

After receiving the first signal, the first processor can determine the current mode. If the first processor is in the first mode, the first processor can output the first trigger instruction used to trigger the first event corresponding to the first signal content according to the event configuration information configured by the user in response to the first signal. The second event corresponding to the first signal content configured by the developer of the operating system cannot be triggered. Thus, the triggering conflict between the two events corresponding to the same content signal may not exist, which satisfies the need of the user to use the electronic device to perform the first event.

After receiving the first signal, if the first processor is in the second mode, although the first signal content satisfies the trigger conditions of the events triggered by two different control methods, the first processor does not respond to the first event triggered by the first control method configured by the user. Thus, even though the first processor outputs the first trigger instruction and the second trigger instruction for triggering the events corresponding to different control methods, the electronic device can perform the second trigger instruction to trigger the corresponding second event and cannot perform the first trigger instruction to trigger the first event.

In the actual application of an electronic device, the mode of the first processor can be controlled to trigger the corresponding first event or second event in the operating system using a control method corresponding to the mode in response to receiving the first signal, which satisfies the operation of generating the first signal that is currently performed by the user. Thus, the electronic device can perform the target action to avoid the conflict between events with the two different control methods configured in the same content signal, which improves the control reliability of the electronic device.

Figure 2:
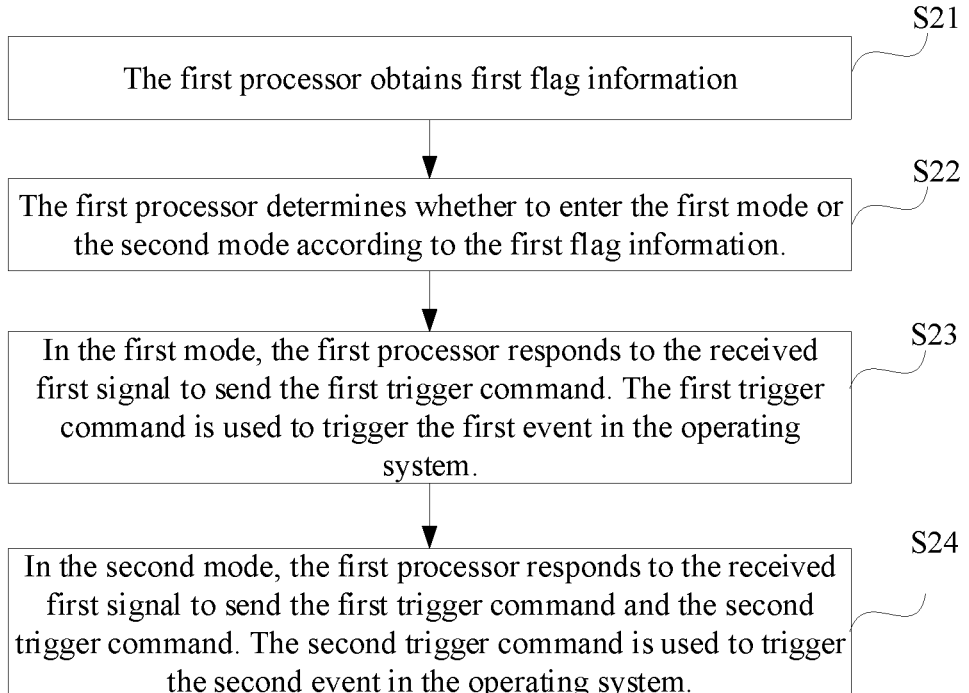
FIG. 2 illustrates a schematic flowchart of another control method according to some embodiments of the present disclosure.

FIG. 2 illustrates a schematic flowchart of another control method according to some embodiments of the present disclosure. In some embodiments, a refined method of the control method above is described in detail. As shown in FIG. 2, the method includes the following processes.

At S21, the first processor obtains first flag information.

In some embodiments, the first flag information can represent whether the first processor triggers the event corresponding to the received signal content, i.e., the second event. If the signal represents that the user performs the Lid Close operation on the electronic device, the first flag information can be a Lid Over Write Flag, which represents whether a Lid Close event is triggered. If the Lid Over Write Flag is 0, the Lid Close event is triggered, and the electronic device can enter the state of the hibernation/sleep/screen off. If the Lid Over Write Flag is 1, the Lid Close event may not be triggered or may not be actively triggered, and only a Mode event can be triggered to realize an application function of screen switching.

For different types of shortcut operations such as Lid Close, screen flipping, or shortcut keys, the corresponding first flag information can be configured in the first processor. The meanings and configuration methods of the first flag information corresponding to different operation types can be similar and can be referred to but is not limited to the configuration implementation method of the Lid Over Write Flag.

In some embodiments, if the operating system of the electronic device includes a target application, such as a special software of an electronic device manufacturer, the first flag information can be configured according to the startup status of the target application or received instruction information. For example, after determining that the target application is started, the first flag information of the first processor can be modified, e.g., 0 in the default states can be updated to 1. In some other embodiments, after the target application is started, the user can input instruction information for modifying the first flag information in the target application to modify the first flag information in the first processor. The implementation process is not limited here.

In the startup process of the target application, related information such as the operation status of the electronic device, and the application status and intention of the user over the electronic device can be monitored, for example, which can be realized by corresponding detection members (e.g., one or more of various sensors, cameras, etc.) in the electronic device, which is not limited here. The electronic device can be configured with a plurality of functions through some functions configured at the target application, which is not limited in the present disclosure.

At S22, the first processor determines whether to enter the first mode or the second mode according to the first flag information.

In connection with the related description of the first flag information, different contents of the first flag information can correspond to different modes of the first processor. Thus, the first processor can read the current first flag information to determine whether the processor is in the first mode or the second mode. Then, when subsequently receiving the first signal, the first processor can determine how to control the triggering of the events.

In some embodiments, the description can be still performed on the example of configuring the first flag information Lid Over Write Flag for the Lid Close event. When the first processor reads the Lid Over Write Flag as 1, the first processor can enter the first mode. The started target application can manage actions configured for the Lid Close operation subsequently, e.g., screen switching, screen off, or hibernation/sleep. That is, the target application can control to trigger the Mode event in the operating system. Otherwise, if the Lid Over Write Flag is 0, the first processor can enter the default second mode to directly trigger the Lid Close event.

At S23, in the first mode, the first processor responds to the received first signal to send the first trigger instruction. The first trigger instruction is used to trigger the first event in the operating system.

At S24, in the second mode, the first processor responds to the received first signal to send the first trigger instruction and the second trigger instruction. The second trigger instruction is used to trigger the second event in the operating system.

In some embodiments, the first signal can be generated by the corresponding detection member of the electronic device for detecting the operation after the user performs the Lid Close, Lid flipping, or shortcut key input on the electronic device. The first signal can be sent to the first processor to trigger the first processor to control the electronic device to perform the first event or the second event according to the control method of the present disclosure.

For example, the description is still made to the example of the Lid Close operation of the laptop. An attitude sensor such as an angle sensor or a distance sensor can be configured between a connection area between the first body (e.g., a body including surface A and surface B) and the second body (e.g., a body including surface C and surface D). When surface B of the first body approaches surface C of the second body, that is, in performing the Lid Close operation, the detection member can continuously output the first signal of the current angle between surface B and surface C. The first signal can be transferred to the first processor in real-time. The first processor can determine the action of the Lid Close operation performed on the laptop according to the change in the first signal in continuous time.

In some embodiments, the detection member can send the first signal representing the operation to the first processor after determining the operation performed on the electronic device according to the sensed signal change. The method of obtaining the first signal is not limited here. Other corresponding types of detection members can be used to detect other operations such as screen flipping or shortcut key input of the electronic device to obtain corresponding first signals. The implementation process is not limited here.

After receiving the first signal, the first processor can read the first flag information corresponding to the first signal, for example, the Lid Over Write Flag corresponding to the Lid Close signal. Thus, the first processor can determine whether to enter the first mode or the second mode according to the Lid Over Write Flag. In response to the first signal, the first processor can determine whether to trigger one event or two events according to the control methods in the mode of the first processor. In the second mode, the first processor can output two trigger instructions to trigger two types of events, such as the Lid Close event and the Mode event. Since the target application is not started in the second mode, the Mode event cannot be performed, and only the Lid Close can be performed, which avoids the conflict between the two types of events.

Thus, in the application of an electronic device such as a laptop with a plurality of screens, the user may want to switch screens to display the display content through the Lid Close or Flipping operation without entering the hibernation/screen off state. After entering the configuration information representing the above meanings electronically, the user can modify the first flag information to represent not triggering the event configured by the operating system manufacturer for the operation by starting the target application or entering instruction information in the target application, e.g., the Lid Close event or Screen flipping event, but triggering the event configured by the user for the operation. Then, when the user performs the Lid Close or flipping operation, the screens can be switched to display the display content according to the description above without conflict with the Lid Close operation for hibernation/screen off.

The method for switching the screens for display is not limited to switching between the screen on surface A and the screen on surface B for display, but also includes switching controls between different display areas on a same screen or between different display interfaces. Similarly, in addition to the control of switching the screens for display, the first event can further include other application control operations, such as screen projection, which can be defined by the user and is not limited here.

Figure 3:
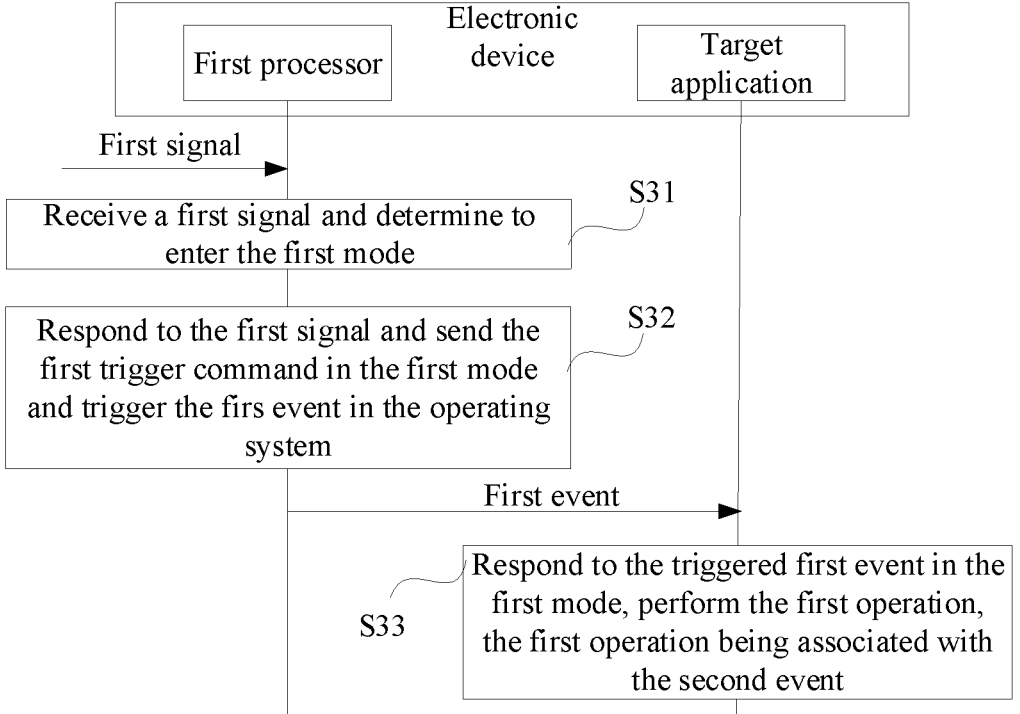
FIG. 3 illustrates a schematic signal-instruction flowchart of another control method according to some embodiments of the present disclosure.

FIG. 3 illustrates a schematic signal-instruction flowchart of another control method according to some embodiments of the present disclosure. Another refined method is described for the control method above. As shown in FIG. 3, the method includes the following processes.

At S31, the first processor receives the first signal and determines to enter the first mode.

For the implementation process of process S31, reference can be made to the description of the corresponding embodiments above, which is not repeated here.

At S32, in the first mode, the first processor responds to the first signal to send the first trigger instruction to trigger the first event in the operating system.

At S33, the target application responds to the first event triggered in the first mode to perform the first operation. The first operation is associated with the second event.

The description is made still to the example of generating the first signal by the Lid Close operation of the laptop. After the user performs the Lid Close operation on the electronic device, if the first processor is determined to be in the first mode, the running target application can take over the control of the actions of the operating system for the Lid Close operation. The first processor can only generate the first trigger instruction to trigger the Mode event and notify a second processor (a processor running the operating system, i.e., CPU) about the Mode event. A target application run by the second processor can respond to the Mode event to query the configuration information of the user for the Lid Close operation to perform the first operation corresponding to the content, e.g., the screen switching operation. The implementation method for performing the first operation is not limited in the present disclosure.

When the first processor is in the first mode, the target application can be configured to respond to the first event to perform the first operation. Thus, the first event can be responded to by the target application of the operating system to satisfy mode-switching control requirements configured by the user for the shortcut operation of the electronic device. The first operation performed by the target application can be associated with the second event. For example, the first operation can include an operation performed to trigger the second event. Thus, the target application can directly control the operating system to perform the first operation associated with the second event or call the first processor to perform the first operation, which is not limited here.

In some embodiments, when the target application calls the first processor to perform the first operation associated with the second event, the first operation can include sending the second signal to the first processor by the target application, e.g., an indication signal of the operation performed by the first processor associated with the second event and configured correspondingly to the first signal. Thus, the target application performing the first operation can include that the target application sends the trigger signal, i.e., the second signal, for the second event to the first processor. The first processor can receive the second signal, respond to the second signal, and send the second trigger instruction to trigger the second event in the operating system, e.g., the Lid Close event. According to the configuration information corresponding to the second event, the operating system can be controlled to enter any one state corresponding to hibernation/sleep/screen off/Do Nothing.

When performing the first operation associated with the second event, the target application can directly call the first processor to trigger the second event according to the above method, and further determine whether to call the first processor in connection with the configuration information content of the second event. Thus, based on the above description, the first operation can include that the target application obtains the configuration information corresponding to the second event. The target application can determine that the configuration information represents the first state, e.g., the state of hibernation or sleep for the Lid Close operation. The target application can send the second signal to the first processor to notify the first processor to trigger the second event and control the operating system to enter the first state.

In some embodiments, to implement the described control method performed by calling the first processor, a call interface API of a trigger device can be added in the first processor for different shortcut operations such as Lid Close, Lid flipping, or shortcut keys, e.g., API defined by script WMI. Thus, when the target application responds to the triggered first event in the first mode to perform the first operation, the target application can call the corresponding API (e.g., operations such as Lid Close or Lid flipping are in one-to-one correspondence with WMI APIs) to send the second signal according to the operation of the electronic device represented by the first signal, notify the first processor to trigger the second event, and control the operating system to enter the corresponding first state. The present disclosure is not limited to the method of the target application calling the first processor to trigger the second event.

Figure 4:
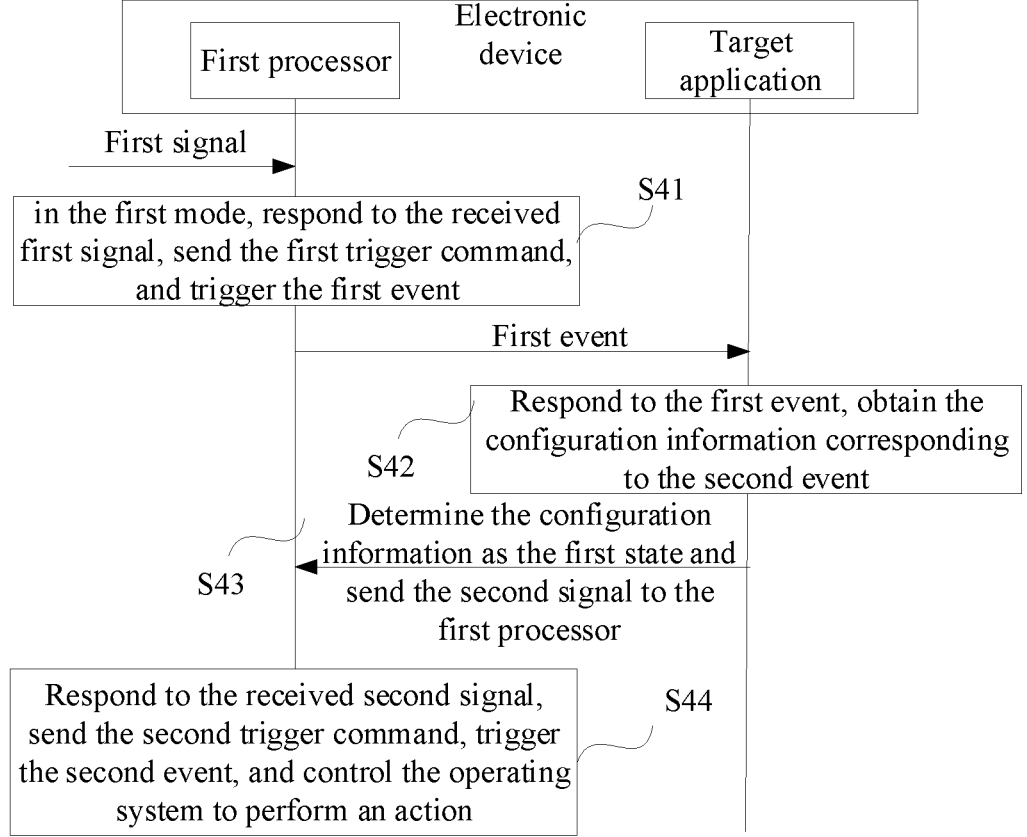
FIG. 4 illustrates a schematic signal-instruction flowchart of another control method according to some embodiments of the present disclosure.

FIG. 4 illustrates a schematic signal-instruction flowchart of another control method according to some embodiments of the present disclosure. FIG. 4 describes an event trigger control method, including that the target application calls the first processor to trigger the second event in the process of the first processor responding to the received first signal in the first mode. For other implementation processes of the control method, reference can be made to the description of corresponding parts in the specification. As shown in FIG. 4, the control method includes the following processes.

At S41, in the first mode, the first processor responds to the received first signal, sends the first trigger instruction, and triggers the first event.

At S42, the target application responds to the first event and obtains the configuration information corresponding to the second event.

At S43, the target application determines that the configuration information corresponds to the first state and sends the second signal to the first processor.

At S44, the first processor responds to the received second signal, sends the second trigger instruction, triggers the second event, and controls the operating system to perform an action.

For example, the description is still made to the example of the Lid Close operation performed on the laptop with the plurality of screens. The Lid Close event and the Mode event can be pre-configured for the Lid Close operation. Thus, after the user performs the Lid Close operation on the laptop with the plurality of screens, the corresponding detection member in the laptop can send the Lid Close signal representing the Lid Close operation to EC. When EC reads the Lid Over Write Flag as 1, it indicates that the target application has been started. The target application can take over the actions of the operating system. The target application can send the trigger instruction for the Mode event to trigger the Mode event and send the trigger instruction for the Mode event to the target application run by the CPU.

After the target application receives the triggered Mode event, in response to the Mode event, the target application can query the Lid Close configuration information corresponding to the Lid Close event. If the Lid Close configuration information represents the first state such as sleep and hibernate or screen off, the target application can call WMI API of the Lid Close Trigger to notify EC to trigger the Lid Close event, send the corresponding control instruction, and control the operating system to enter the first state. If the Lid Close event is correspondingly configured with Do Nothing, i.e., the second state, the target application may not need to notify EC to trigger the Lid Close event. The target application can directly perform the operation of screen switching according to the configuration corresponding to the first event. The two trigger control methods of the first event and the second event corresponding to other shortcut operations can be similar and are not described in detail here.

In some embodiments, while the target application performs the first operation in response to the triggered first event in the first mode, the target application can directly control the operating system to perform actions, including but are not limited to hibernate or sleep and screen off or switching screen for display content for the at least one screen of the electronic device. Thus, a control interface can be pre-configured for the operating system. After the target application responds to the first event, the target application can directly call the control interface to directly control the operating system to perform actions, such as hibernation or sleep, or screen off or screen switching.

In some embodiments, after the target application responds to the first event, in connection with the configuration information of the second event, the target application can determine whether to call the first processor or directly control the operating system to perform actions, and the target application can also determine what action the operating system performs. Thus, the first operation can include the target application obtaining the configuration information corresponding to the second event. When the configuration information represents the first state (e.g., the operating system configured for the Lid Close operation entering the hibernation or sleep state), according to the configuration information, the target application can call the control interface corresponding to the first state, such as the hibernation control interface, to control the operating system to perform the first action to enter the first state. Therefore, the first action can correspond to the second event and can be suitable for the scene where the configuration information of the first event includes the first state.

If the configuration information configured for the second event represents the second state (e.g., Do Nothing), according to the content of the configuration information, the interface in the configuration information corresponding to the first event different from the interface corresponding to the content of the configuration information of the second event can be called, e.g., the screen switch interface in the Mode event, to directly control the operating system to perform the second action to realize the first function. If the Lid is closed, the display content on the screen on surface B can be switched to be displayed on the screen on surface A. The method for the screen on surface A to display the content from the screen on surface B is not limited here.

Thus, the second action can cooperate with the triggered first event to realize the first function. In the configuration information of the first event, if the shortcut operation corresponds to Do Nothing configured for the second event, the target application can configure the screen-switching action or other actions to realize other functions. The user can configure by themselves, which is not described in detail here.

Figure 5:
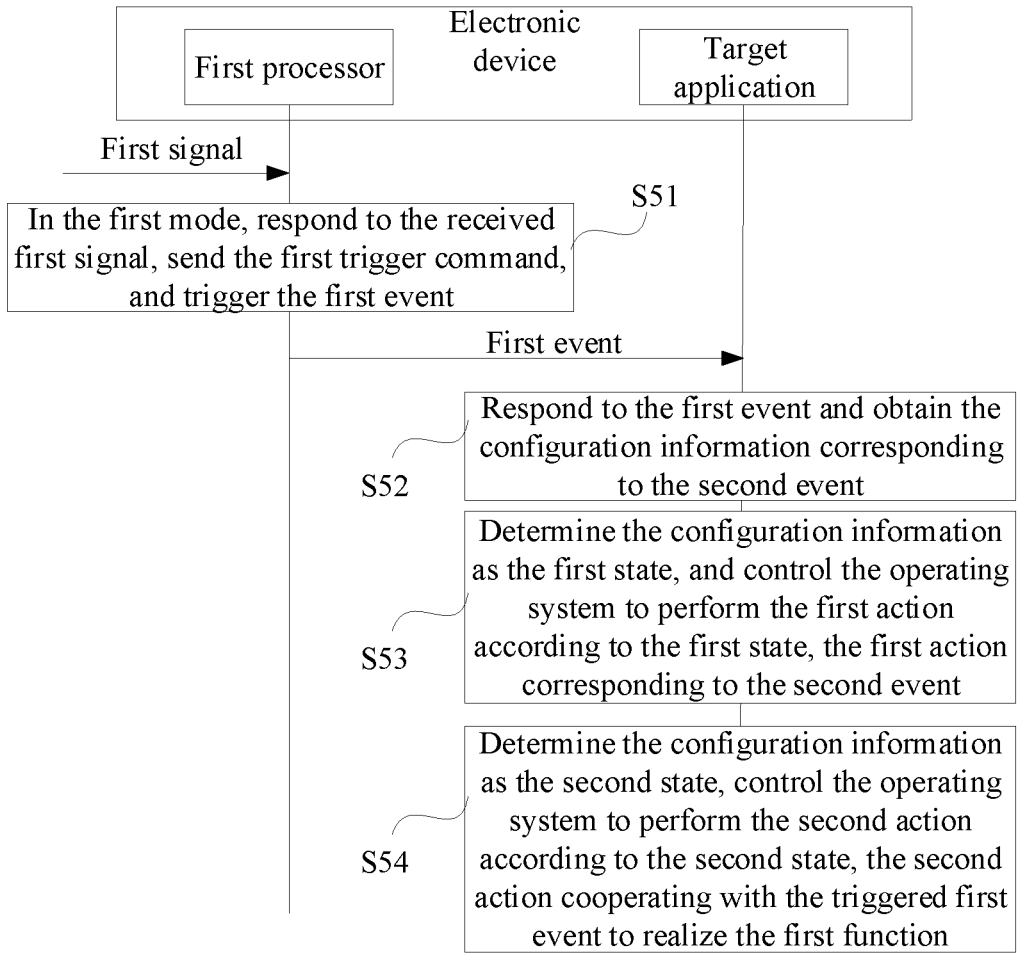
FIG. 5 illustrates a schematic signal-instruction flowchart of another control method according to some embodiments of the present disclosure.

Based on the description above, FIG. 5 illustrates a schematic signal-instruction flowchart of another control method according to some embodiments of the present disclosure. The trigger control method of the target application directly controlling the operating system to perform actions can be described. As shown in FIG. 5, the method includes the following processes.

At S51, the first processor responds to the received first signal in the first mode, sends the first trigger instruction, and triggers the first event.

At S52, the target application responds to the first event and obtains the configuration information corresponding to the second event.

At S53, the target application determines that the configuration information corresponds to the first state and controls the operating system to perform the first action according to the first state. The first action corresponds to the second event.

At S54, the target application determines that the configuration information corresponds to the second state and controls the operating system to perform the second action according to the second state. The second action cooperates with the triggered first event to realize the first function.

The description is still made to the example of performing the Lid Close operation on the laptop with the plurality of screens. The Lid Close event and the Mode event can be pre-configured for the Lid Close operation. EC can receive the Lid Close signal for the Lid Close operation, read the Lid Over Write Flag as 1, send the trigger instruction for the Mode event, and trigger the Mode event. After EC transmits the Mode event to the target application run by the CPU, the target application can respond to the Mode event, query the Lid close configuration information corresponding to the Lid Close event as Sleep and Hibernate or Screen off, call the control interface of the operating system, and directly control the operating system to enter the corresponding state such as sleep and hibernate or screen off. If the Lid Close event corresponds to the configuration of Do Nothing, the screen switch interface in the Mode event can be called to control the operating system to perform switching among the plurality of screens. For example, the display content on the screen on surface B can be switched to be displayed on the screen on surface A. The implementation process for other functions can be similar and is not described in detail here.

In summary, when the first event and the second event are performed simultaneously in the operating system, to avoid conflict, the second event can interrupt the first event. For example, in response to the received first signal in the first mode, the first processor can first trigger the first event to be performed. In this process, the first processor can be called in some scenes to trigger the second event to be performed. Thus, the operating system can include the triggered first event and the second event. However, in performing the first event, the triggered second event can interrupt the first event. Thus, the second event can be directly performed. For the description of the implementation, reference can be made to the description of the related part of embodiments of the present disclosure, which is not limited here.

When the first event and the second event are performed simultaneously in the operating system, the method can include but is not limited to the first processor responding to the first signal in the first mode. The response rules can be flexibly configured for the first event and the second event as needed, which is not listed one by one in the present disclosure.

Thus, when the first processor is in the second mode, the first processor can respond to the first signal as described in the related part of the present disclosure. The first processor can also send the first trigger instruction for triggering the first event and the second trigger instruction for triggering the second event. Then, the first event and the second event can be triggered and sent to the second processor. In the second mode, the electronic device may not include/start the target application that responds to the first event. The operating system can only respond to the second event. For the implementation process, reference can be made to the related description after the first processor triggers the second event, which is not repeated here.

Figure 6:
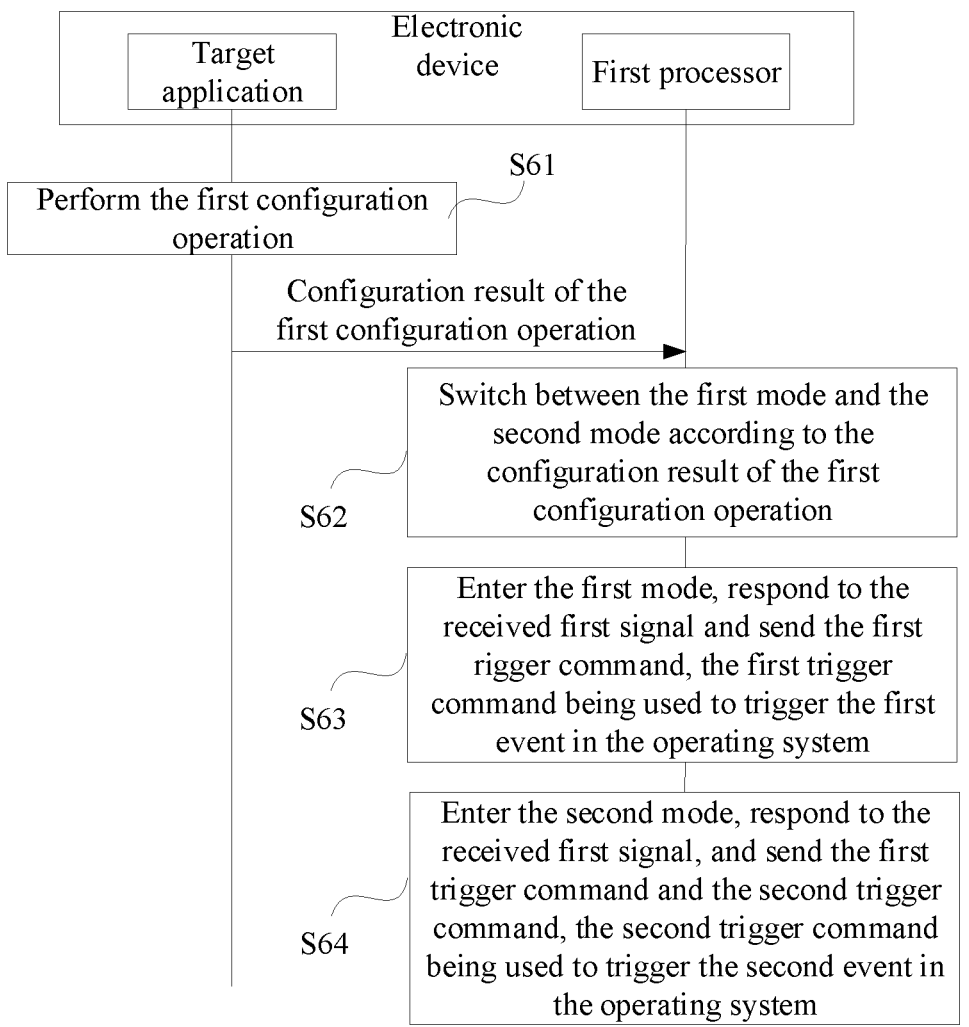
FIG. 6 illustrates a schematic signal-instruction flowchart of another control method according to some embodiments of the present disclosure.

FIG. 6 illustrates a schematic signal-instruction flowchart of another control method according to some embodiments of the present disclosure. As shown in FIG. 6, the method includes the following processes.

At S61, the target application performs the first configuration operation.

At S62, the first processor performs mode switching between the first mode and the second mode according to the configuration result of the first configuration operation.

At S63, the first processor enters the first mode, responds to the received first signal, and sends the first trigger instruction. The first trigger instruction is used to trigger the first event in the operating system.

At S64, the first processor enters the second mode, responds to the received first signal, and sends the first trigger instruction and the second trigger instruction. The second trigger instruction is used to trigger the second event in the operating system.

The target application can perform the first configuration operation to cause the first processor to switch the mode between the first mode and the second mode, which avoids the conflict between two events for the same content signal. Thus, the application requirement of the user for the electronic device can be realized reliably. For the implementation process of the first configuration operation, reference can be made to the related description of the control method performed by the first processor, which is not repeated here.

In some embodiments, during the implementation process of the target application performing the first configuration operation, the first flag information can be configured according to the startup state of the target application to cause the first processor to determine whether to enter the first mode or the second mode according to the first flag information. For the implementation of the control method, reference can be made to the related description of the present disclosure.

In some embodiments, during the startup process of the target application, the first event trigger interface can be called to cause the Basic Input Output System (BIOS) chip to modify the first flag information stored in EC. For example, the first flag digit can be updated from a value of the default state to a value of another state. In some embodiments, if the first event triggered by the first mode is the Mode event, the Get Base Mode interface can be called. The BIOS program can run to modify the corresponding Flag stored in EC RAM to 1 (the Flag is 0 in the default state). The method may not be limited to the method of modifying the first flag information.

Figure 7:
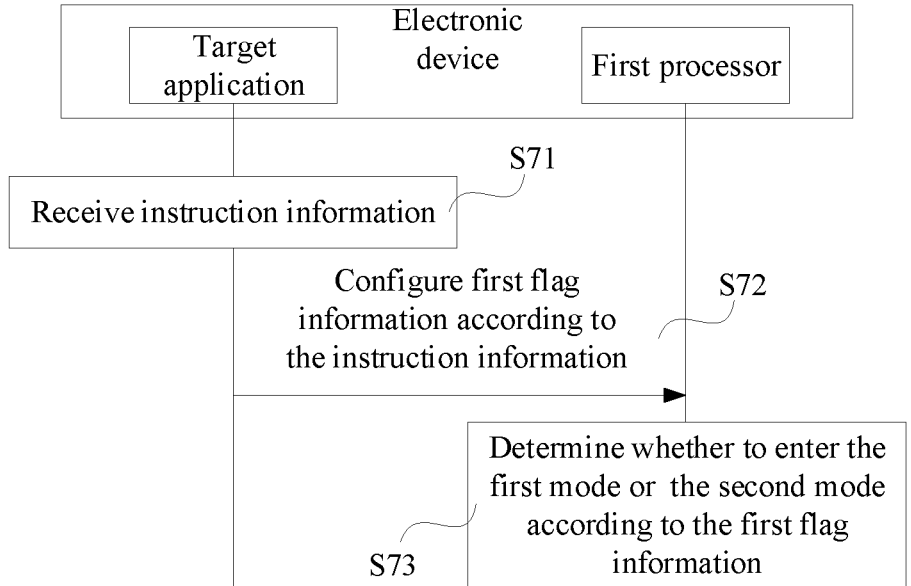
FIG. 7 illustrates a schematic signal-instruction flowchart of another control method according to some embodiments of the present disclosure.

In some other embodiments, as shown in FIG. 7 illustrates a schematic signal-instruction flowchart of another control method according to some embodiments of the present disclosure. As shown in FIG. 7, the method includes the following processes.

At S71, the target application receives the instruction information.

At S72, the target application configures the first flag information according to the instruction information.

In connection with the description of the corresponding part, the instruction information for modification can be input. The instruction information for modification can be input for the first flag that needs to be configured. Thus, the information of the first flag can be configured to obtain the corresponding first flag information. The content of the instruction information and the acquisition method are not limited here.

At S73, the first processor determines whether to enter the first mode or the second mode according to the first flag information.

In some embodiments, for different types of shortcut operations for Lid Close, Lid flipping, or shortcut keys. The user can configure the new action or the state of the operating system, such as the switching action or a screen projection action, or adjustment display position, which is different from the action/state configured by the operating system manufacturer, for example, the state of hibernation of sleep corresponding to the Lid Close operation. To avoid the conflict between two types of events corresponding to the same operation. The corresponding first flag information can be configured in the first processor to determine whether to allow the second event to be directly triggered.

In some embodiments, in the first mode, the first processor can trigger the first event and may not directly trigger the second method. When the target application responds to the first event, the target application can call the first processor to trigger the second event, which satisfies the state control needs for Lid Close or sleep. For the implementation, reference can be made to the corresponding part of embodiments of the present disclosure and may not be described in detail here. In addition, for the control process of the first processor receiving and responding to the first signal after determining whether to enter the first mode or the second mode, reference can be made to the description of the corresponding part of embodiments of the present disclosure, which is not repeated here.

Figure 8:
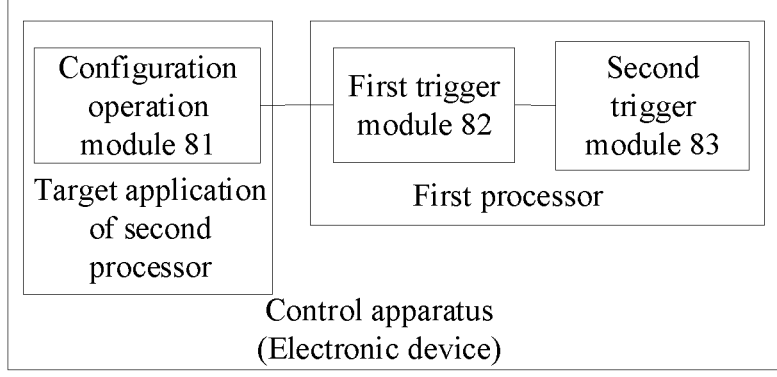
FIG. 8 illustrates a schematic structural diagram of a control apparatus according to some embodiments of the present disclosure.

FIG. 8 illustrates a schematic structural diagram of a control apparatus according to some embodiments of the present disclosure. The apparatus includes a configuration operation module 81, a first trigger module 82, and a second trigger module 83.

The configuration operation module 81 can be configured for the target application to perform the first configuration operation to cause the first processor to switch the mode between the first mode and the second mode.

The first trigger module 82 can be configured to respond to the received first signal and send the first trigger instruction when the first processor is in the first mode. The first trigger instruction can be used to trigger the first event in the operating system.

The second trigger module 83 can be configured to respond to the received first signal and send the first trigger instruction and the second trigger instruction when the first processor is in the second mode. The second trigger instruction can be used to trigger the second event in the operating system.

In connection with the related description of the control method of the present disclosure, the first trigger module 82 and the second trigger module 83 can be deployed at the first processor of the electronic device, e.g., EC. The configuration operation module 81 can be deployed at the second processor of the electronic device. The second processor can support the running of the operating system of the electronic device, e.g., the CPU.

In some embodiments, to implement the control method, the target application can be installed in the second processor. Thus, when the first processor enters the first mode, the target application can respond to the triggered first event. The implementation process is not described in detail here. When the first event and the second event are performed simultaneously in the operating system, the second event can interrupt the first event.

In some embodiments, the configuration operation module 81 can include a first configuration unit or an instruction information reception unit, and a second configuration unit.

The first configuration unit can be configured to configure the first flag information according to the startup state of the target application, or the instruction information reception unit can be configured to receive the instruction information.

The second configuration unit can be configured to configure the first flag information according to the instruction information.

Based on this, the apparatus can also include a first acquisition module and a first determination module deployed in the first processor.

The first acquisition module can be configured to obtain the first flag information. The first flag information can be configured according to the target application in the operating system.

The first determination module can be configured to determine whether to enter the first mode or the second mode according to the first flag information.

In some other embodiments, the apparatus can further include a first event response module and a first operation execution module deployed in the second processor.

The first event response module can be configured to respond to the first event triggered in the first mode.

The first operation execution module can be configured to perform the first operation by the target application after the first event is responded to. The first operation can be associated with the second event.

In some embodiments, the first operation execution module can include a first transmission unit configured for the target application to send the second signal to the first processor and a second transmission unit configured to determine the configuration information to represent the first state and send the second signal to the first processor.

The first transmission unit can include a first acquisition unit configured to obtain the configuration information corresponding to the second event.

The apparatus can further include a second response module deployed in the first processor, configured to send the second trigger instruction in response to the received second signal.

In some other embodiments, the first operation execution module can also include a first control unit configured to directly control the operating system to perform an action.

In some embodiments, the first control unit can include a second acquisition unit and a second control unit.

The second acquisition unit can be configured to obtain the configuration information corresponding to the second event.

The second control unit can be configured to determine that the configuration information represents the first state and control the operating system to perform the first action according to the configuration information. The first action can correspond to the second event.

In some other embodiments, the first control unit can include a third acquisition unit and a third control unit.

The third acquisition unit can be configured to obtain the configuration information corresponding to the second event.

The third control unit can be configured to determine that the configuration information indicates the second state and control the operating system to perform the second action according to the configuration information. The second action can cooperate with the triggered first event to achieve the first function.

The various modules and units of the above device embodiments can be implemented as program modules stored in memory and executed by the corresponding target application run by the first processor or the second processor to perform the program modules stored in the memory to implement the corresponding functions. For the functions realized by the program modules and the combination of the program modules and the achieved technical effect, reference can be made to method embodiments of the present disclosure, which are not repeated here.

The present disclosure further provides a computer-readable storage medium storing computer programs that, when called and loaded by the processor, cause the processor to perform the processes of the control method of embodiments of the present disclosure.

The present disclosure further provides an electronic device suitable for the control method. The electronic device can at least include a detection member, a first processor, and a second processor. The detection member can include various sensors and a communication detector and can be configured to detect the operation state and/or the attitude change information of the electronic device and send the corresponding first signal to the first processor. The first processor can be EC and can be configured to perform the control method suitable for the first processor. The second processor can be the CPU, which supports the operating system of the electronic device to run the target application after the target application is installed in the electronic device to perform the control method on the side of the target application, which is not repeated here.

The structure of the electronic device does not limit the electronic device of embodiments of the present disclosure. In some embodiments, the electronic device can include more members or a combination of some members. For example, the electronic device can include at least one input assembly of a touch sensing unit that detects a touch event on a touch display panel, a keyboard, a mouse, a camera, or a microphone, at least one output assembly of a monitor, a speaker, a vibration mechanism, and a lighting, an antenna, a sensor module, and a power supply module, which can be determined according to the type and the function of the electronic device. The present disclosure does not list the members one by one.

In the specification, the relation terms such as "first" and "second" of embodiments of the present disclosure are only used to distinguish an operation, a unit, or a module from another operation, another unit, or another module, and do not necessarily require or imply any actual relationship or order among the units, operations, or modules. In addition, terms like "including," "comprising," or variations thereof are intended to cover non-exclusive inclusions, such that processes, methods, or systems including a series of elements not only include those elements but also include other elements not explicitly listed, or also include the elements inherent to the processes, methods, or systems. When there is no further limitation, the element defined by "including a . . ." does not exclude that the processes, the methods, or the systems including the element also include another identical element.

Embodiments of the present disclosure are described in a progressive or parallel manner. Each embodiment focuses on its differences from other embodiments. The same and similar parts between the various embodiments can be referred to each other. Since apparatus and electronic device embodiments correspond to method embodiments of the present disclosure, the description of the apparatus and electronic device embodiments is simple. For the relevant details, reference can be made to the description of the method embodiments.

The above description of embodiments of the present disclosure enables those skilled in the art to implement or use the present disclosure. Various modifications to embodiments of the present disclosure are apparent to those skilled in the art. The generic principles defined here can be realized in other embodiments without departing from the spirit or scope of the present disclosure. Therefore, the present disclosure is not limited to embodiments of the present disclosure but should conform to the widest scope consistent with the principles and novel features of the present disclosure.

What is claimed is:

1. A control method for an electronic device comprising:

in response to a received first signal, sending a first trigger instruction when a first processor is in a first mode, the first trigger instruction being used to trigger a first event in an operating system, the first processor being implemented as an embedded controller (EC) that is distinct from a second processor that executes the operating system, the first event in the operating system comprising a mode event responded to by a target application in the operating system executed by the second processor; and in response to the received first signal, sending the first trigger instruction and a second trigger instruction when the first processor is in a second mode, the second trigger instruction being used to trigger a second event in the operating system, the second event corresponding to the received first signal and being configured independently of the target application.

2. The method according to claim 1, wherein when the first event and the second event are performed simultaneously in the operating system, and the second event is able to interrupt the first event.

3. The method according to claim 1, further comprising:

obtaining a first flag information by the first processor, the first flag information being configured according to the target application in the operating system; and determining whether to enter the first mode or the second mode by the first processor according to the first flag information.

4. The method according to claim 1, wherein in the first mode, the target application in the operating system responds to the first event, after responding to the first event, the target application is configured to perform a first operation, and the first operating is associated with the second event.

5. A control method for an electronic device comprising:

performing a first configuration operation by a target application in an operating system to cause a first processor to switch between a first mode and a second mode, the first processor being implemented as an embedded controller (EC) that is distinct from a second processor that executes the operating system;

wherein:

in the first mode, the first processor responds to a received first signal and sends a first trigger instruction, the first trigger instruction is used to trigger a first event in an operating system, and the first event in the operating system comprises a mode event responded to by the target application in the operating system executed by the second processor; and in the second mode, the first processor responds to the received first signal and sends the first trigger instruction and a second trigger instruction, the second trigger instruction is used to trigger a second event in the operating system, and the second event corresponds to the received first signal and is independent of the target application.

6. The method according to claim 5, wherein performing the first configuration operation by the target application includes configuring first flag information according to a startup status of the target application and causing the first processor to determine whether to enter the first mode or the second mode according to the first flag information.

7. The method according to claim 5, further comprising:

responding to the first event triggered in the first mode by the target application; and after responding to the first event, performing a first operation by the target application, the first operation being associated with the second event.

8. The method according to claim 7, wherein performing the first operation includes sending a second signal to the first processor by the target application to cause the first processor to respond to the received second signal to send the second trigger instruction.

9. A control apparatus deployed with a first processor of an electronic device comprising:

a first trigger module configured to respond to a received first signal and send a first trigger instruction when the first processor is in a first mode, the first trigger instruction being used to trigger a first event in an operating system, the first processor being implemented as an embedded controller (EC) that is distinct from a second processor that executes the operating system, the first event in the operating system comprising a mode event responded to by a target application in the operating system executed by the second processor; and a second trigger module configured to respond to the received first signal and send the first trigger instruction and a second trigger instruction when the first processor is in a second mode, the second trigger instruction being used to trigger a second event in the operating system, the second event corresponding to the received first signal and being configured independently of the target application.

10. The apparatus according to claim 9, wherein when the first event and the second event are performed simultaneously in the operating system, and the second event is able to interrupt the first event.

11. The apparatus according to claim 9, further comprising:

a first acquisition module configured to obtain a first flag information, the first flag information being configured according to the target application in the operating system; and

S 12,596,423 B2 a first determination module configured to determine whether to enter the first mode or the second mode by the first processor according to the first flag information.

12. The apparatus according to claim 9, wherein in the first mode, the target application in the operating system responds to the first event, after the target application is configured to respond to the first event, the target application performs a first operation, and the first operating is associated with the second event.

\* \* \* \* \*